US012646383B2

(12) United States Patent
Thoeni et al.

(10) Patent No.: US 12,646,383 B2
(45) Date of Patent: *Jun. 2, 2026

(54) LOTTERY TICKET VENDING MACHINE

(71) Applicant: Brightstar Global Solutions Corporation, Providence, RI (US)

(72) Inventors: Stewart Thoeni, Reno, NV (US); Paul A. Bucci, Glocester, RI (US); Thomas Quaranta, North Kingstown, RI (US); Wayne Forsey, Riverview (CA)

(73) Assignee: Brightstar Global Solutions Corporation, Providence, RI (US)

( * ) Notice: Subject to any disclaimer, the term of this patent is extended or adjusted under 35 U.S.C. 154(b) by 223 days.

This patent is subject to a terminal disclaimer.

(21) Appl. No.: 18/423,871

(22) Filed: Jan. 26, 2024

(65) Prior Publication Data

US 2025/0246050 A1     Jul. 31, 2025

(51) Int. Cl.
| | |
|---|---|
| *G07F 17/32* | (2006.01) |
| *G06K 7/10* | (2006.01) |
| *G07F 11/68* | (2006.01) |

(52) U.S. Cl.
CPC ....... *G07F 17/329* (2013.01); *G06K 7/10821* (2013.01); *G07F 11/68* (2013.01)

(58) Field of Classification Search
CPC ........ G07F 17/329; G07F 17/42; A63F 3/065; A63F 3/0605; G07C 15/005; Y10T 225/35; Y10S 283/903; G07B 5/02; G07B 3/00; B26F 3/006; B65H 35/10
See application file for complete search history.

(56) References Cited

U.S. PATENT DOCUMENTS

| | | | |
|---|---|---|---|
| 3,855,457 | A | 12/1974 | Amundson et al. |
| 4,350,264 | A | 9/1982 | Muller |
| 4,982,337 | A * | 1/1991 | Burr ..................... G07C 15/005 |
| | | | 400/621 |
| 5,222,624 | A | 6/1993 | Burr |
| 5,268,561 | A | 12/1993 | Kimura et al. |
| 5,272,321 | A * | 12/1993 | Otsuka ...................... G07F 9/02 |
| | | | 700/238 |

(Continued)

FOREIGN PATENT DOCUMENTS

| | | | | |
|---|---|---|---|---|
| CA | 2379687 | C * | 11/2005 | ............... G07B 3/00 |
| DE | 102005032337 | A1 * | 1/2007 | ............... G07B 5/00 |

(Continued)

*Primary Examiner* — Milap Shah

(74) *Attorney, Agent, or Firm* — Neal, Gerber & Eisenberg LLP

(57) ABSTRACT

A lottery ticket vending machine configured to determine if its ticket bursters are improperly separating the lottery tickets received from the ticket drawers of the ticket drawer columns, and to make one or more adjustments and/or alert an operator if its ticket bursters are improperly separating the lottery tickets. In various embodiments, each of the tickets bursters includes a suitable barcode reader configured to sense at least one barcode of each lottery ticket received in such ticket burster. In various embodiments, the lottery ticket vending machine includes one or more controllers configured to receive barcode positional data from the barcode reader and make such determinations regarding any adjustments and/or alerts, and to cause any such adjustments and/or alerts.

20 Claims, 10 Drawing Sheets

(56)                  References Cited

U.S. PATENT DOCUMENTS

| | | | |
|---|---|---|---|
| 5,408,417 A | | 4/1995 | Wilder |
| 5,836,498 A | | 11/1998 | Turek |
| 6,095,624 A | * | 8/2000 | Wilbert .................... G07B 3/04 |
| | | | 312/293.3 |
| 6,206,263 B1 | * | 3/2001 | Rich ........................ B41J 11/42 |
| | | | 226/45 |
| 6,609,644 B1 | | 8/2003 | Menna |
| 6,637,634 B1 | | 10/2003 | Yeo et al. |
| 6,712,253 B2 | | 3/2004 | Hargrave et al. |
| 6,714,838 B2 | | 3/2004 | Scrymgeour et al. |
| 6,726,077 B2 | | 4/2004 | Roberts et al. |
| 6,886,728 B2 | * | 5/2005 | Roberts .................... C09D 4/06 |
| | | | 225/105 |
| 6,994,230 B2 | | 2/2006 | Sams |
| 7,032,774 B2 | | 4/2006 | Boehm et al. |
| 7,383,099 B2 | | 6/2008 | Pollard et al. |
| 7,562,798 B2 | | 7/2009 | Bartolone et al. |
| 7,665,394 B2 | | 2/2010 | Roberts et al. |
| 7,850,257 B2 | | 12/2010 | Roberts et al. |
| 8,127,973 B2 | | 3/2012 | Mirkovic et al. |
| 8,192,268 B1 | | 6/2012 | Karpe |
| 8,210,921 B1 | | 7/2012 | Karpe |
| 8,534,524 B2 | | 9/2013 | Businger et al. |
| 8,550,294 B2 | | 10/2013 | Martin |
| 9,613,337 B1 | | 4/2017 | Garrison |
| 9,685,026 B1 | | 6/2017 | Garrison |
| 10,438,452 B2 | | 10/2019 | Ferron et al. |
| 11,010,987 B2 | | 5/2021 | Bucci |
| 12,080,132 B2 | * | 9/2024 | Topalian ................. B26F 3/002 |
| 2001/0049986 A1 | * | 12/2001 | Roberts .............. G07F 17/3248 |
| | | | 83/13 |
| 2003/0120381 A1 | | 6/2003 | Perin et al. |
| 2003/0204288 A1 | * | 10/2003 | Scrymgeour ........ G07C 15/005 |
| | | | 700/236 |

| | | | |
|---|---|---|---|
| 2004/0000572 A1 | | 1/2004 | Engelhardt, Jr. et al. |
| 2004/0254008 A1 | | 12/2004 | Anderson et al. |
| 2005/0178810 A1 | | 8/2005 | Woods et al. |
| 2006/0173576 A1 | | 8/2006 | Goerg et al. |
| 2007/0017978 A1 | | 1/2007 | Ho |
| 2007/0088459 A1 | | 4/2007 | Pollard et al. |
| 2007/0172106 A1 | | 7/2007 | Paraskevakos |
| 2008/0290127 A1 | | 11/2008 | Bartolone et al. |
| 2010/0308071 A1 | | 12/2010 | Businger |
| 2011/0042403 A1 | | 2/2011 | Martin |
| 2012/0085777 A1 | | 4/2012 | Bucci et al. |
| 2014/0008407 A1 | | 1/2014 | Bucci et al. |
| 2014/0117614 A1 | | 5/2014 | Kallin et al. |
| 2014/0263619 A1 | | 9/2014 | Turocy et al. |
| 2014/0353375 A1 | | 12/2014 | Turocy et al. |
| 2015/0066207 A1 | | 3/2015 | Erb |
| 2016/0232741 A1 | | 8/2016 | Assis et al. |
| 2017/0004671 A1 | * | 1/2017 | Connolly ............... G07F 11/44 |
| 2018/0108203 A1 | | 4/2018 | Li et al. |
| 2018/0186557 A1 | * | 7/2018 | Ghia ..................... B65D 83/12 |
| 2018/0186558 A1 | | 7/2018 | Mejenborg et al. |
| 2020/0023265 A1 | | 1/2020 | Kennedy |
| 2022/0108562 A1 | | 4/2022 | Claude et al. |
| 2022/0114842 A1 | | 4/2022 | Mejenborg et al. |
| 2022/0114860 A1 | | 4/2022 | Mejenborg et al. |
| 2023/0084907 A1 | | 3/2023 | Gonzalez et al. |
| 2024/0021054 A1 | | 1/2024 | Topalian et al. |
| 2025/0118127 A1 | | 4/2025 | Thoeni et al. |
| 2025/0166445 A1 | * | 5/2025 | Topalian .......... G06K 19/06028 |

FOREIGN PATENT DOCUMENTS

| | | | | |
|---|---|---|---|---|
| IT | 20090162 A1 | 3/2011 | | |
| JP | H11306413 A | 11/1999 | | |
| KR | 0139213 Y1 | * | 4/1999 | ............. G07F 11/00 |
| KR | 0175637 B1 | * | 4/1999 | ............. G07F 11/24 |
| WO | 2004099915 A2 | 11/2004 | | |

* cited by examiner 500　510　513

Lottery Game

- When you win $5, $10, $15, $20, $50, $60, $100, $150, $200 or $500, see any New Jersey Lottery Retailer for payment.

- All other winners fill out a claim form mailer at any New Jersey Lottery Retailer for payment.

- All prizes must be claimed within one year of the announced end of game

All winners, tickets and transactions subject to New Jersey Lottery Rules and Regulation and State Law. All prize awards are subject to claim procedures, validation tests, and other applicable requirements of the New Jersey Lottery. Liability for void or nonconfirming ticket, if any, is limited to replacement of ticket with unplayed ticket. Not responsible for lost or stolen tickets. All games may not be available at all retail locations. Prize availability subject to prior claims. For top prizes remaining, visit njlottery.net.

515 ⎯      516

SIGNATURE

Play responsibly. If you or someone you know has a gambling problem, call 1-800-GAMBLER.

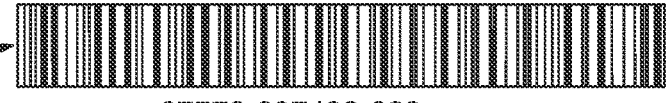

Lottery Game

- When you win $5, $10, $15, $20, $50, $60, $100, $150, $200 or $500, see any New Jersey Lottery Retailer for payment.

- All other winners fill out a claim form mailer at any New Jersey Lottery Retailer for payment.

- All prizes must be claimed within one year of the announced end of game

All winners, tickets and transactions subject to New Jersey Lottery Rules and Regulation and State Law. All prize awards are subject to claim procedures, validation tests, and other applicable requirements of the New Jersey Lottery. Liability for void or nonconfirming ticket, if any, is limited to replacement of ticket with unplayed ticket. Not responsible for lost or stolen tickets. All games may not be available at all retail locations. Prize availability subject to prior claims. For top prizes remaining, visit njlottery.net.

615

616

SIGNATURE

Play responsibly. If you or someone you know has a gambling problem, call 1-800-GAMBLER.

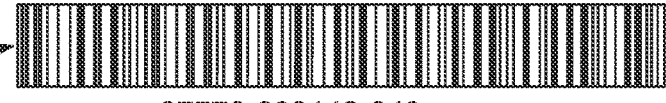

LOTTERY TICKET VENDING MACHINE

CROSS-REFERENCE TO RELATED APPLICATIONS

This patent application is related to the following commonly owned co-pending patent applications: U.S. patent application Ser. No. 17/812,570, entitled "LOTTERY TICKET VENDING MACHINE,"; U.S. application Ser. No. 18/480,167, entitled "LOTTERY TICKET VENDING MACHINE,"; U.S. patent application Ser. No. 18/480,136, entitled "LOTTERY TICKET VENDING MACHINE,"; U.S. patent application Ser. No. 18/481,521, entitled: "LOTTERY TICKET VENDING MACHINE,"; and U.S. patent application Ser. No. 18/492,299, entitled: "LOTTERY TICKET VENDING MACHINE,".

BACKGROUND

The present disclosure relates to lottery ticket vending machines.

Lottery tickets such as instant lottery tickets may be printed on a strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine including: a housing; a ticket drawer column in the housing wherein the ticket drawer column includes a plurality of ticket drawers, each of the ticket drawers configured to hold a strip of lottery tickets; and a ticket burster in the housing, the ticket burster defining a ticket inlet and a ticket outlet, the ticket burster movable to a plurality of different ticket receipt positions, each different ticket receipt position associated with and in alignment with a different one of the ticket drawers. The lottery ticket vending machine further includes: a barcode reader supported by the ticket burster and configured to create and send barcode positional data based on a position of a lottery ticket that moves from one of the ticket drawers into the ticket burster; and a controller configured to receive the barcode positional data from the barcode reader, determine if the lottery ticket has is improperly positioned based on the barcode positional data, and cause a corrective action to be taken responsive to determining that the lottery ticket is improperly positioned.

In various other embodiments, the present disclosure relates to a lottery ticket vending machine including: a housing; a ticket drawer column in the housing, wherein the ticket drawer column includes a plurality of ticket drawers, each of the ticket drawers configured to hold a strip of lottery tickets; a ticket burster in the housing; and a controller. The ticket burster defines a ticket inlet and a ticket outlet, and is movable to a plurality of different ticket receipt positions, wherein each different ticket receipt position associated with and in alignment with a different one of the ticket drawers. The ticket burster further includes a ticket cutter, and a barcode reader configured to create barcode positional data for a lottery ticket that moves from one of the ticket drawers into the ticket burster based on a barcode of the lottery ticket, wherein the barcode reader is positioned such that the barcode reader can determine the barcode positional data before the ticket cutter cuts perforations connecting the lottery ticket to a next lottery ticket of the strip of lottery tickets. The ticket burster is configured to transmit the barcode positional data. The controller is configured to receive the barcode positional data from the barcode reader, determine if the lottery ticket has a position issue based on the barcode positional data, and cause a corrective action to be taken responsive to determining that the lottery ticket has the position issue.

In various other embodiments, the present disclosure relates to a lottery ticket vending machine including: a housing; a lottery ticket drawer supported by the housing; a ticket burster supported by the housing and comprising a barcode reader; and a controller supported by the housing. The controller is configured to operate with the barcode reader to determine if lottery tickets from the lottery ticket drawer are being fed in to the ticket burster in proper positions to enable the ticket burster to properly separate lottery tickets received from the lottery ticket drawer based on one or more barcodes on the substrates of the lottery tickets, and to cause a corrective action to be taken responsive to determining that the lottery tickets are not in the proper positions.

Additional features are described in, and will be apparent from, the following Detailed Description and the figures.

BRIEF DESCRIPTION OF THE SEVERAL VIEWS OF THE DRAWINGS

FIG. 9 is an image of the back side of an example lottery ticket showing a first barcode in a predetermined stationary position.

FIG. 10 is a fragmentary image of the back side of another example lottery ticket showing a second barcode in a predetermined stationary position.

DETAILED DESCRIPTION

Figure 1:
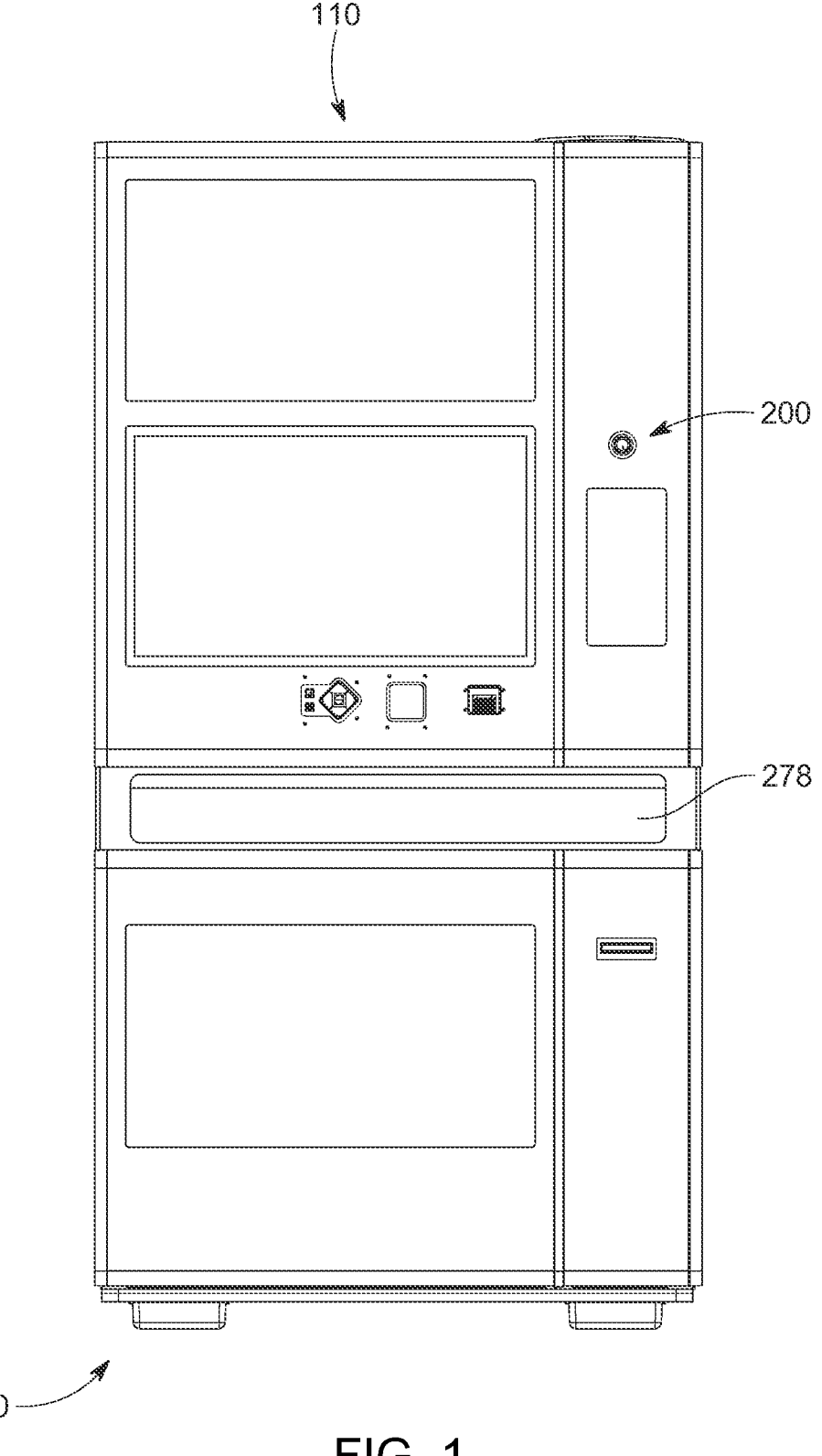
FIG. 1 is a front perspective view of a lottery ticket vending machine of one example embodiment of the present disclosure shown with a front door thereof in a closed position.

In various embodiments, the present disclosure relates to a lottery ticket vending machine that includes one or more ticket bursters and one or more ticket drawers, and that is configured to: (1) determine if any of the lottery tickets received by the ticket bursters from the ticket drawers are improperly positioned (in a manner that can cause the ticket bursters to improperly separate the lottery tickets); and (2) in response to such determination, to make one or more adjustments and/or alert an operator of the improper positioning of any such the lottery tickets.

In various embodiments, each of the ticket bursters of the lottery ticket vending machine includes one or more suitable barcode readers configured to: (1) read the barcode on each lottery ticket received in such ticket burster and provide barcode related data to one or more controllers of the lottery ticket vending machine; and (2) provide barcode positional data to one or more controllers of the lottery ticket vending machine. In various such embodiments, the one or more controllers are configured to receive the barcode related data from the one or more barcode readers, analyze such barcode related data to determine information regarding the lottery ticket. In various embodiments, the one or more controllers are also configured to receive the barcode positional data from the one or more barcode readers, analyze such barcode positional data with respect to comparison data, and make determinations regarding the lottery ticket position relative to the ticket burster, and any needed adjustments and/or alerts, and to cause any such determined needed adjustments and/or alerts to be made.

In various other embodiments, each of the ticket bursters of the lottery ticket vending machine includes: (1) one or more barcode readers configured to read the barcode on each lottery ticket received in such ticket burster and provide barcode related data to one or more controllers of the lottery ticket vending machine; and (2) one or more other sensors (such as but not limited to reflective sensors) configured to determine a position of the barcode on each lottery ticket received in such ticket burster and provide barcode positional data to one or more controllers of the lottery ticket vending machine. In various such embodiments, the one or more controllers are configured to receive the barcode related data from the one or more barcode readers, analyze such barcode related data to determine information regarding the lottery ticket. In various embodiments, the one or more controllers are also configured to receive the barcode positional data from the one or more other sensors, analyze such barcode positional data with respect to comparison data, and make determinations regarding the lottery ticket position relative to the ticket burster, and any needed adjustments and/or alerts, and to cause any such determined needed adjustments and/or alerts to be made.

For a better understanding of the present disclosure, example instant lottery tickets are first generally described herein.

Various known instant lottery tickets are single game instant lottery tickets. An example single game instant lottery ticket can include: (1) a ticket substrate having a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket barcodes, and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information.

For each instant lottery ticket of a lottery game, each printed lottery ticket includes a barcode in the exact same location on the substrate of each instant lottery ticket. Each barcode is of the same dimensions including the same length and the same width. This is shown in the example lottery tickets 500 and 600 in FIGS. 9 and 10 that have respective barcodes 530 and 630. The barcodes 530 and 630 are different because they each identify the specific instant lottery ticket. These barcodes 530 and 630 are applied as part of their printing process and used for identification of each respective instant lottery ticket. Thus, while the actual barcodes for each lottery ticket varies to identify that specific unique lottery ticket, the relative positions of the barcodes on the respective substrates of the lottery tickets 500 and 600 do not vary.

Various known single game instant lottery tickets include multiple predefined scratch-off areas, multiple sets of variable lottery game indicia printed on the predefined scratch-off areas, and multiple SOCs covering the variable lottery game indicia sets. Various known instant lottery tickets are multi-game instant lottery tickets and can be larger than single game tickets. Instant lottery tickets can also be of the known pull tab type. Instant lottery tickets can have a width that varies from 2 to 4 inches and a length that varies from 2 to 12 inches. The term lottery ticket as used herein is intended to cover these various different types and other types of lottery tickets that can be dispensed in a same or similar manner as these types of lottery tickets.

Various lottery tickets are often arranged after manufacture (which includes after complete printing) in lottery ticket packs for storage, organization, sorting, picking, shipping to lottery ticket distributors or ticket retailers, and validation. Instant lottery ticket packs can include a plurality of lottery tickets (that are all of the same type, same size, and for the same game(s), and can be protected for storage and shipping by a transparent pack wrapping, such as transparent plastic wrapping, securely wrapped around the plurality of lottery tickets. A pack of lottery tickets can include all of the lottery tickets attached to each other but joined by perforations. Such lottery tickets of a pack can be detached from each other along such perforations. While lottery tickets of each pack are often manufactured in a continuous strip that is fan-folded for convenient supply, the packs can be in other forms such as in a roll form. These packs in the fan-folded form or in the roll form are configured to dispensing via a lottery ticket vending machine.

Lottery ticket vending machines can include various components such as but not limited to pinch roller, stepper motors, and cutting blades to separate and dispense lottery tickets from a pack of lottery tickets. One issue with these components is miscut lottery tickets. For example, a miscut can occur when a lottery ticket is improperly registered from one perforation connecting adjacent lottery tickets in a strip of lottery tickets to the next lottery ticket in that strip. When the proper registration starts to erode, cuts not at the perforations, but rather adjacent to the perforations can further compound the registration problem.

More specifically, when a ticket burster receives a lottery ticket, the ticket burster can properly or improperly separate the lottery ticket from the next lottery ticket (of a pack in a lottery ticket drawer). The reasons that such an improper separation can occur can include, but are not limited to one or more of: (1) a misalignment of the lottery tickets in the ticket drawer that leads to a misalignment of the lottery tickets as they are fed into the ticket burster; (2) a misalignment of the ticket burster relative to the ticket drawer that feeds the lottery tickets into the ticket burster; (3) misaligned or mis-registered feeding of the lottery ticket by the lottery ticket engagers (such as the driven rollers) of the ticket burster that move and guide the lottery ticket in the ticket burster; (4) slippage between the lottery ticket and the lottery ticket engagers (such as the driven rollers) of the ticket burster; (5) changes to (such as shrinkage of) the lottery ticket engagers (such as the driven rubber rollers) of the ticket burster; (6) unclean or imprecise previous separations such as cuts for previous lottery tickets in the lottery ticket strip; (7) deformations or extra pieces attached to the leading edges of lottery tickets from previously attached lottery tickets; (8) indentations or cut-outs in the leading edges of the lottery tickets; and (9) improperly formed perforations in a strip of lottery tickets.

To address these issues, various embodiments of the present disclosure provide a lottery ticket vending machine that uses one or more barcode reader (such as described below) to, in addition to determining the barcode related data, determine barcode positional data to enable the lottery ticket vending machine to determine if each lottery ticket received in a ticket burster is in a correct position for separation of that lottery ticket from the next lottery ticket in the strip of lottery tickets. The present disclosure thus contemplates detecting the positions of the barcodes of each lottery ticket for determining any positioning issues and for addressing such positioning issues. The lottery ticket vending machine is configured to take one or more corrective actions (such as adjusting one or more components of the vending machine or the positions thereof) to address determined lottery ticket positioning issue(s), and/or is configured to provide one or more alerts to an operator of the vending machine that enables the operator to fix the cause of such determined lottery ticket positioning issue(s). It should be appreciated that these actions including the alerts can be suitably tracked and stored (such as by the controller of the lottery ticket vending machine or a remote system) for future reference and use.

Turning now to FIGS. 1, 2, 3, 4, 5, 6, 7, and 8, a lottery ticket vending machine of one example embodiment of the present disclosure is generally illustrated and indicated by numeral 100. The lottery ticket vending machine 100 may be referred to herein as the "ticket vending machine" or the "vending machine" for brevity.

The illustrated example ticket vending machine 100 includes: (a) a machine housing 110 including a front door 200; (b) three ticket drawer columns 300a, 300b, and 300c positioned in and supported by the machine housing 110; and (c) three separate and independently movable ticket bursters 400a, 400b, and 400c positioned in the machine housing 110 and supported by burster supports (not labeled) positioned in and supported by the machine housing 110. The front door 200 includes a ticket collection receptacle 250 configured to receive separated lottery tickets from each of the ticket bursters 400a, 400b, and 400c. The quantity, positions, sizes, and configurations of the ticket drawer columns and the ticket bursters can vary in accordance with the present disclosure.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not labeled) positioned in and supported by the machine housing 110; and (2) various purchaser interface components (not labeled) that are part of the front door 200 of the machine housing 110. These components are only briefly described herein for brevity. Such electronic components can be arranged in any suitable manner. The electronic component holder can be in the form of a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control the operation of the ticket vending machine 100 including the movable ticket bursters 400a, 400b, and 400c as further discussed herein to facilitate the dispensing of each requested lottery ticket and the determination of any position issues of the lottery tickets (such as further described below). The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) store(s) instructions executable by the processing device(s) to control operation of the ticket vending machine 100. The purchaser interface components include one or more display devices, one or more input devices, and one or more payment acceptors. The purchaser interface components enable purchasers to use such components to determine the lottery tickets available from the ticket vending machine 100, and to select and pay for any of those lottery tickets held by the ticket vending machine 100 that the purchaser desires to obtain. The purchaser interface components can display images and information to inform purchasers of the different lottery tickets available from the ticket vending machine 100 and to assist in completing the selection and purchase of such lottery tickets. These electronic components and purchaser interface components can take many different forms as well known in the industry, and are thus not described in detail herein for brevity.

Figure 2:
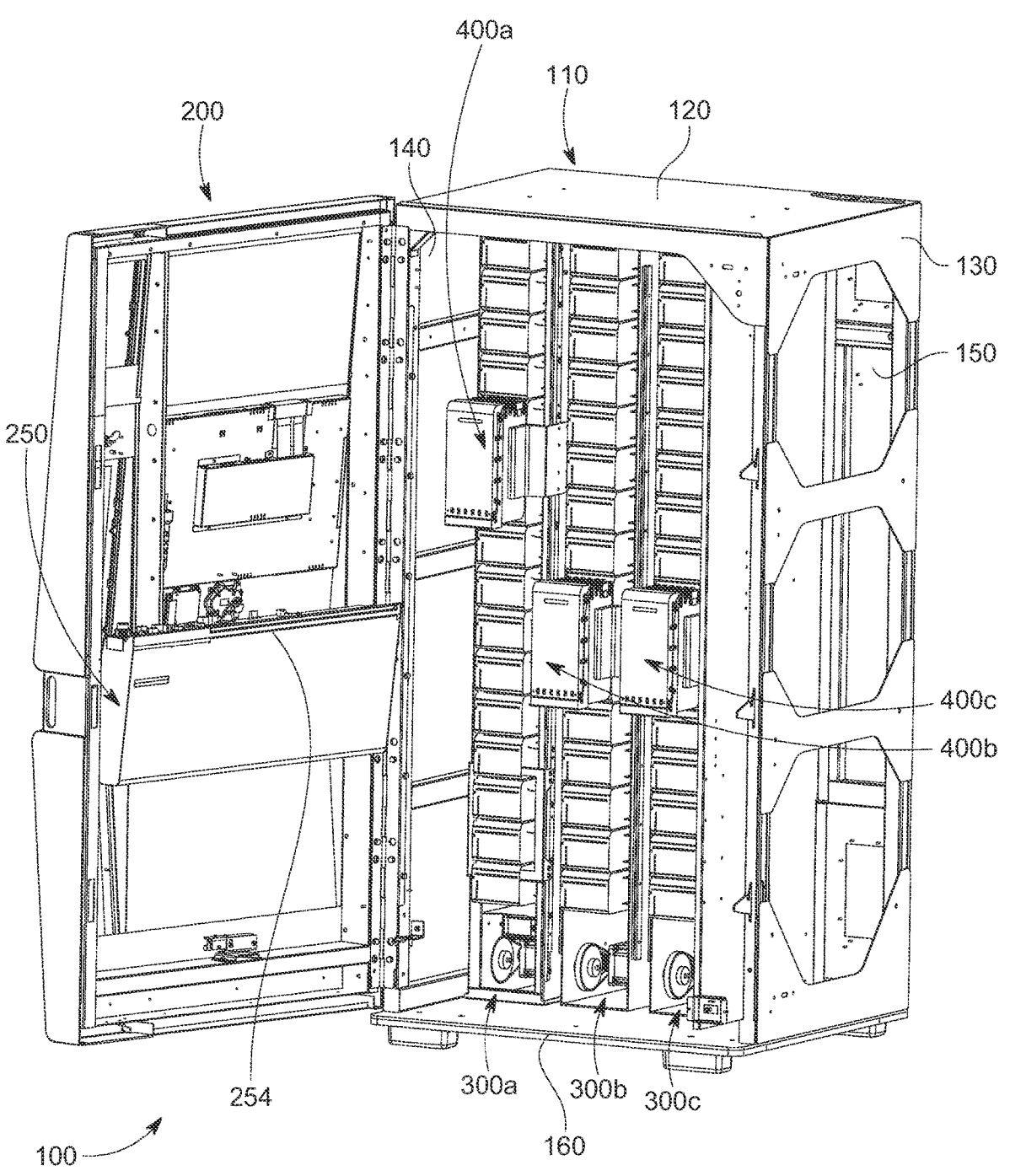
FIG. 2 is a front perspective view of the lottery ticket vending machine of FIG. 1 shown with the front door thereof in an open position, shown with a left side wall panel thereof removed, showing three ticket drawer columns and three movable ticket bursters respectively associated the three ticket drawer columns, and showing a ticket collection receptacle of the front door.
Figure 3:
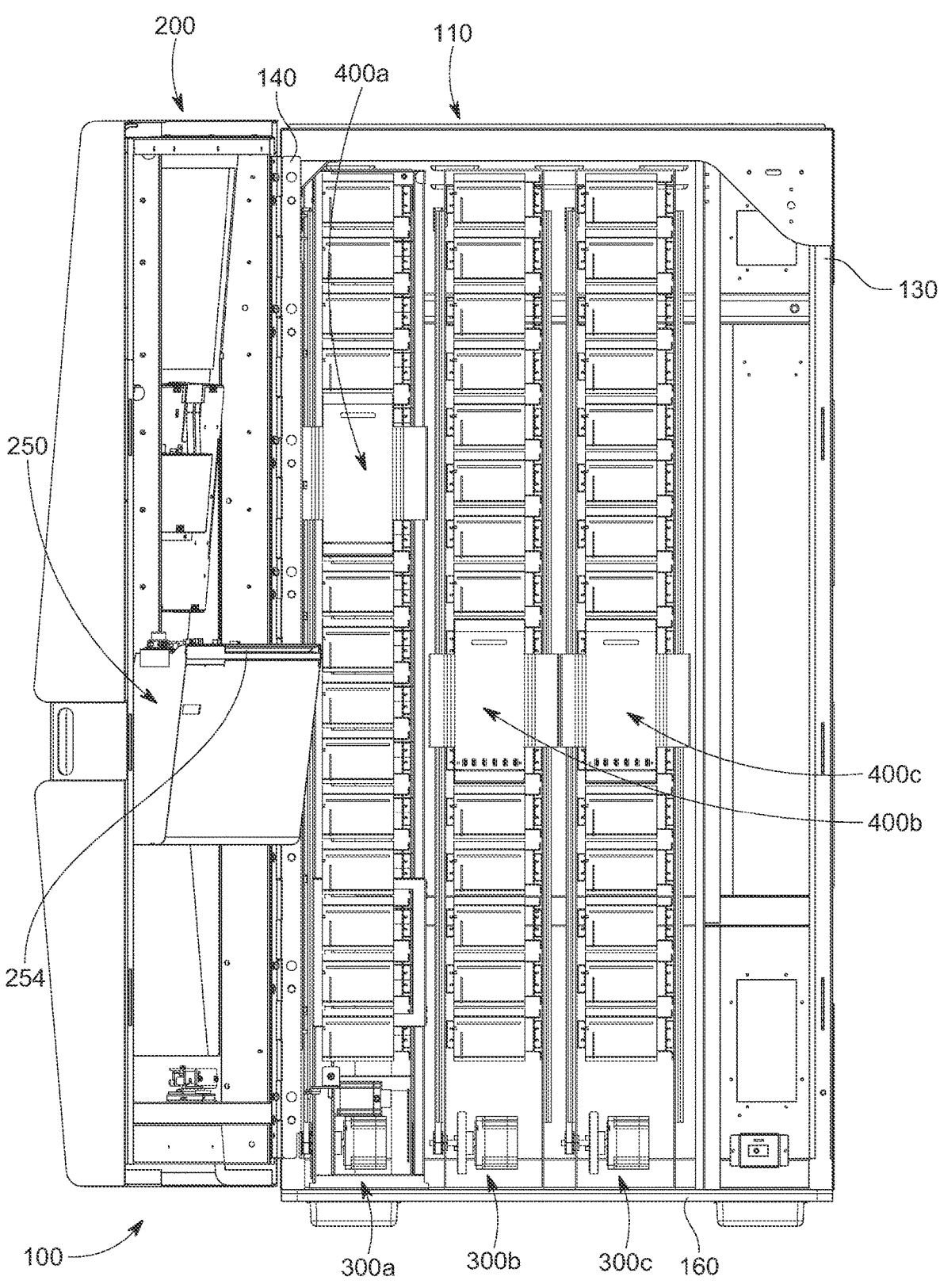
FIG. 3 is a front view of the lottery ticket vending machine of FIG. 1 shown with the front door thereof in the open position, shown with the left side wall panel thereof removed, showing the three ticket drawer columns and the three movable ticket bursters respectively associated the three ticket drawer columns, and showing the ticket collection receptacle of the front door.
Figure 4:
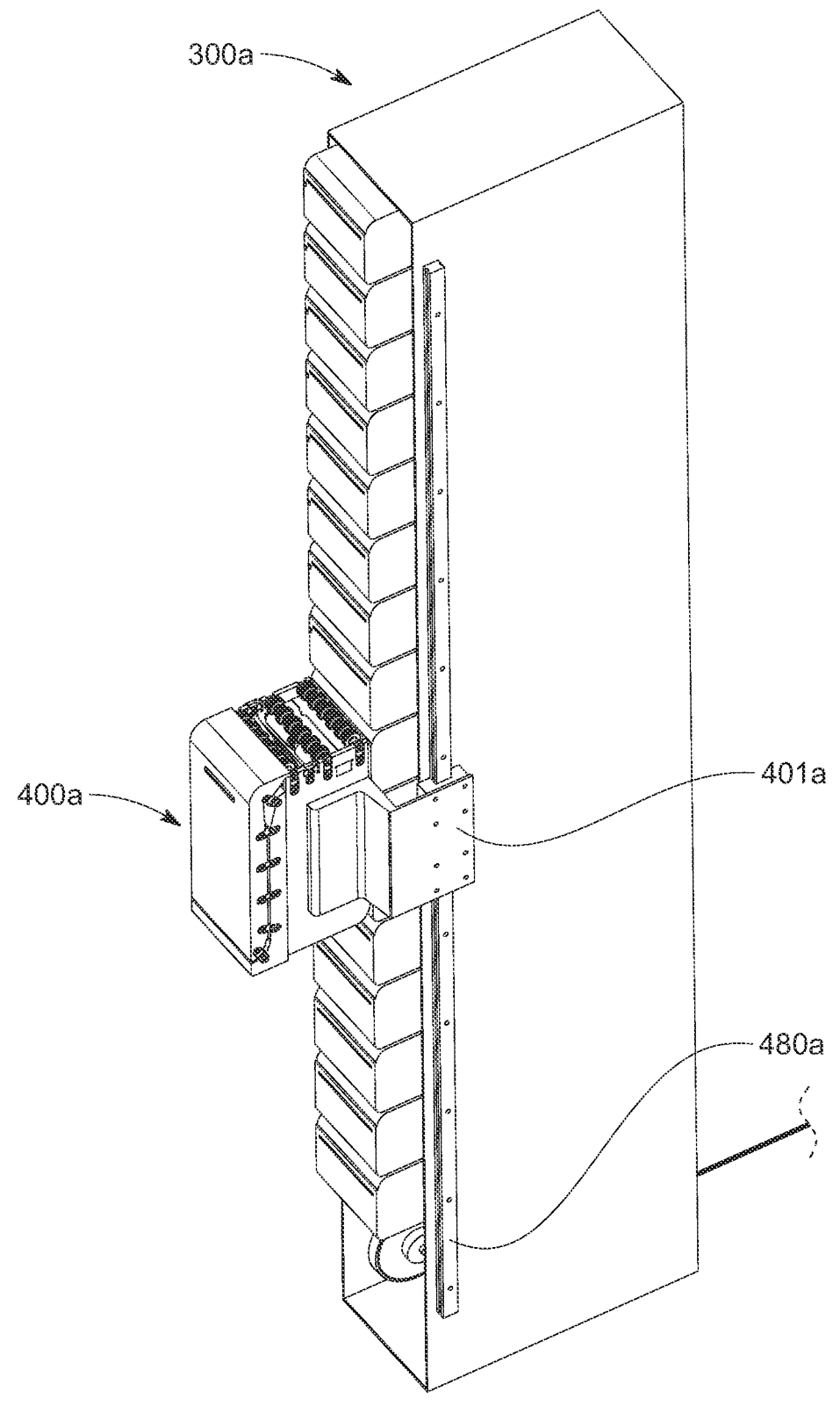
FIG. 4 is an enlarged fragmentary perspective view of one of the ticket drawer columns and the ticket burster associated with that ticket drawer column of the lottery ticket vending machine of FIG. 1 shown removed from the lottery ticket vending machine.

In this illustrated example embodiment, the machine housing 110 includes a top wall 120, spaced-apart side walls 130 and 140, a rear wall 150, a base 160, and the openable front door 200 pivotally connected to the side wall 140. The base 160 is configured to rest on a floor or other suitable support. The machine housing 110 includes suitable vertically extending supports (not labeled) configured to hold and support the respective ticket drawer columns 300a, 300b, and 300c. The front door 200 is moveable from a closed and locked position covering the open front face of the machine housing 110 as shown in FIG. 1 to an open position allowing access to the interior of the machine housing 110 as shown in FIGS. 2 and 3. The front door 200 is mounted by hinges (not labeled) to the side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components (such as those described below). The size and configuration of the machine housing can vary in accordance with the present disclosure.

The ticket collection receptacle 250 of the front door 200 is configured to receive lottery tickets from each of the movable ticket bursters 400a, 400b, and 400c. The ticket collection receptacle 250 is configured to hold each lottery ticket received from the movable ticket bursters to enable the respective purchaser to retrieve the dispensed lottery ticket from the ticket collection receptacle 250. The ticket collection receptacle defines an elongated horizontally extending ticket receiving slot 254 (best seen in FIGS. 2 and 3). The ticket collection receptacle 250 and the front door define an elongated horizontally extending purchase ticket retrieval slot 278 (best seen in FIG. 1). The purchase ticket retrieval slot 278 is (and needs to be) large enough so that a purchaser can insert the purchaser's hand through the purchase ticket retrieval slot 278 to retrieve lottery tickets that are dispensed into the ticket collection receptacle 250. The ticket receiving slot 254 is (and needs to be) small enough so that a purchaser cannot insert the purchaser's hand through the ticket receiving slot 254 and thereby cannot access any of the ticket drawers of the ticket drawer columns 300a, 300b, or 300c. The position, size, and configuration of the ticket collection receptacle can vary in accordance with the present disclosure.

Each of the ticket drawer columns 300a, 300b, and 300c are identical in this example embodiment. For brevity, only ticket drawer column 300a is described in detail herein. Likewise, the three movable ticket bursters 400a, 400b, and 400c are identical in this example embodiment. For brevity, only ticket burster 400a associated with the ticket drawer column 300a is described herein.

Ticket drawer column 300a includes a series of aligned ticket drawers (not individually labeled) that are vertically stacked in the column. Each of the ticket drawers is configured to hold one or more packs of lottery tickets such as instant lottery tickets for subsequent dispensing by the ticket vending machine 100. The ticket drawers can vary in quantity, size, and configuration depending upon the particular size of the ticket vending machine 100 and the quantity, size, and shapes of the lottery tickets that the ticket vending machine 100 can or will dispense. Each ticket drawer is configured to hold lottery tickets such as instant lottery tickets for selection by the purchasers. In various embodiments, the different ticket drawers can hold different lottery ticket packs for different lottery games, but it should be appreciated, that two or more ticket drawers can hold the same type of lottery tickets. In various embodiments, each of the ticket drawers is configured to feed each instant lottery ticket held by that ticket drawer into the associated ticket burster 400a when the ticket burster 400a is moved into alignment with such ticket drawer for receipt, bursting, and dispensing of that lottery ticket. This ticket movement can be caused by an actuation lever of the burster engaging a ticket movement assembly of the ticket drawer, or in another suitable manner. Bursting of the lottery ticket is the industry term for separating a lottery ticket from a pack of lottery tickets held in a ticket drawer. In this example embodiment, the ticket drawers do not burst the lottery tickets and do not need any mechanisms for bursting the lottery tickets, but rather the moveable ticket burster 400a bursts the lottery tickets fed by the ticket drawers in the ticket drawer column 300a into that ticket burster 400a.

As shown in FIGS. 2, 3, 4, and 5, the movable ticket burster 400a is supported by one or more burster supporters (such as burster supporter 480a). The burster supporters can be any suitable structure(s) that support(s) the ticket burster 400a in a manner that enables the ticket burster 400a to vertically move to any of the different ticket receipt positions that are associated with and in alignment with the respective ticket drawers of the ticket drawer column 300a. Each of the burster supporters also support the ticket burster 400a in a manner that enables the ticket burster 400a to vertically move to into alignment with the ticket receptacle 250.

The ticket vending machine 100 includes one or more actuators (not shown) that control movement of the ticket burster 400a under control of the controller of the ticket vending machine 100 and/or the controller of the ticket burster 400a. In this example, an actuator (not labeled) is mounted at the bottom of the ticket drawer column 300a and coupled to the ticket burster 400a by suitable linkages (such as but not limited to pulleys and a drive belt (not labeled)). The actuator is configured to move the ticket burster 400a under the control of the controller(s) in the vertical (e.g., up and down) directions. The movable ticket burster 400a is thus moveable, via this actuator and linkages on the ticket burster supporters to different vertical locations including a plurality of the locations respectively associated and aligned with each of the ticket drawers of the ticket drawer column 300a such that the ticket burster 400a is positioned to receive one or more of the lottery tickets stored in each respective ticket drawer of the ticket drawer column 300a for obtaining and dispensing that instant lottery ticket into the ticket receptacle 400 for the purchaser as requested by the purchaser.

Figure 5:
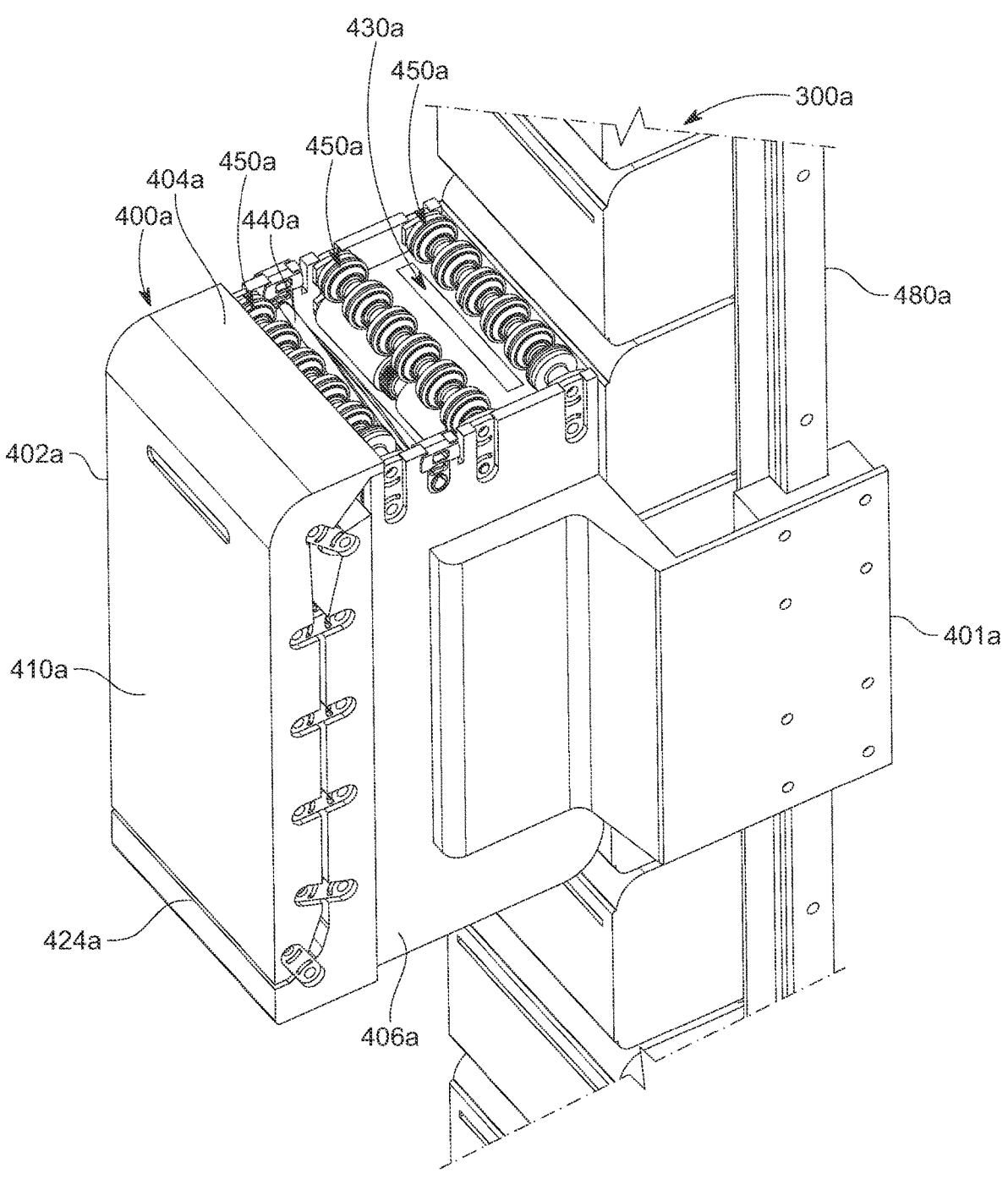
FIG. 5 is an enlarged fragmentary perspective view of the ticket drawer column and the ticket burster of FIG. 4.
Figure 6:
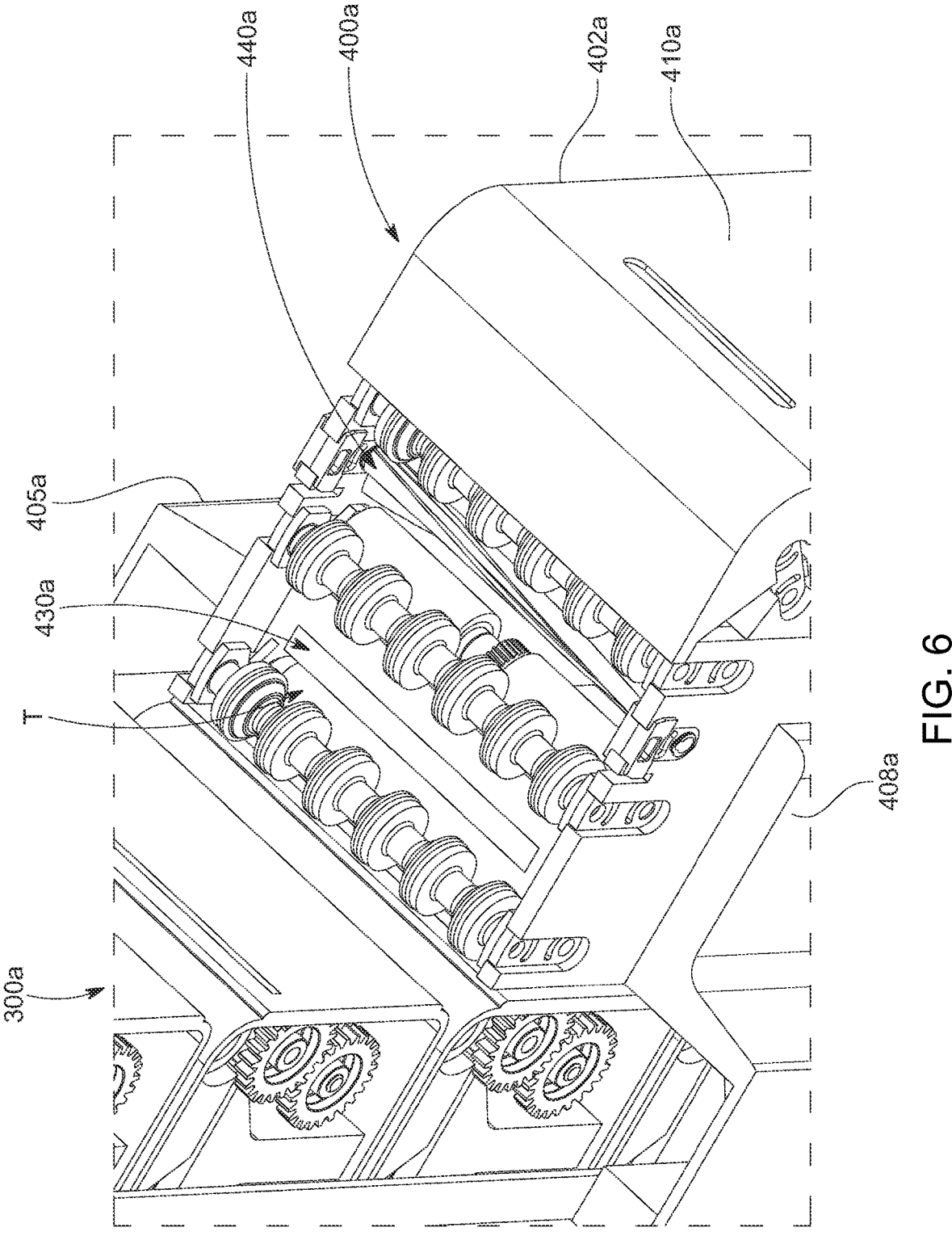
FIG. 6 is another enlarged fragmentary perspective view of the ticket drawer column and the ticket burster of FIG. 4.
Figure 7:
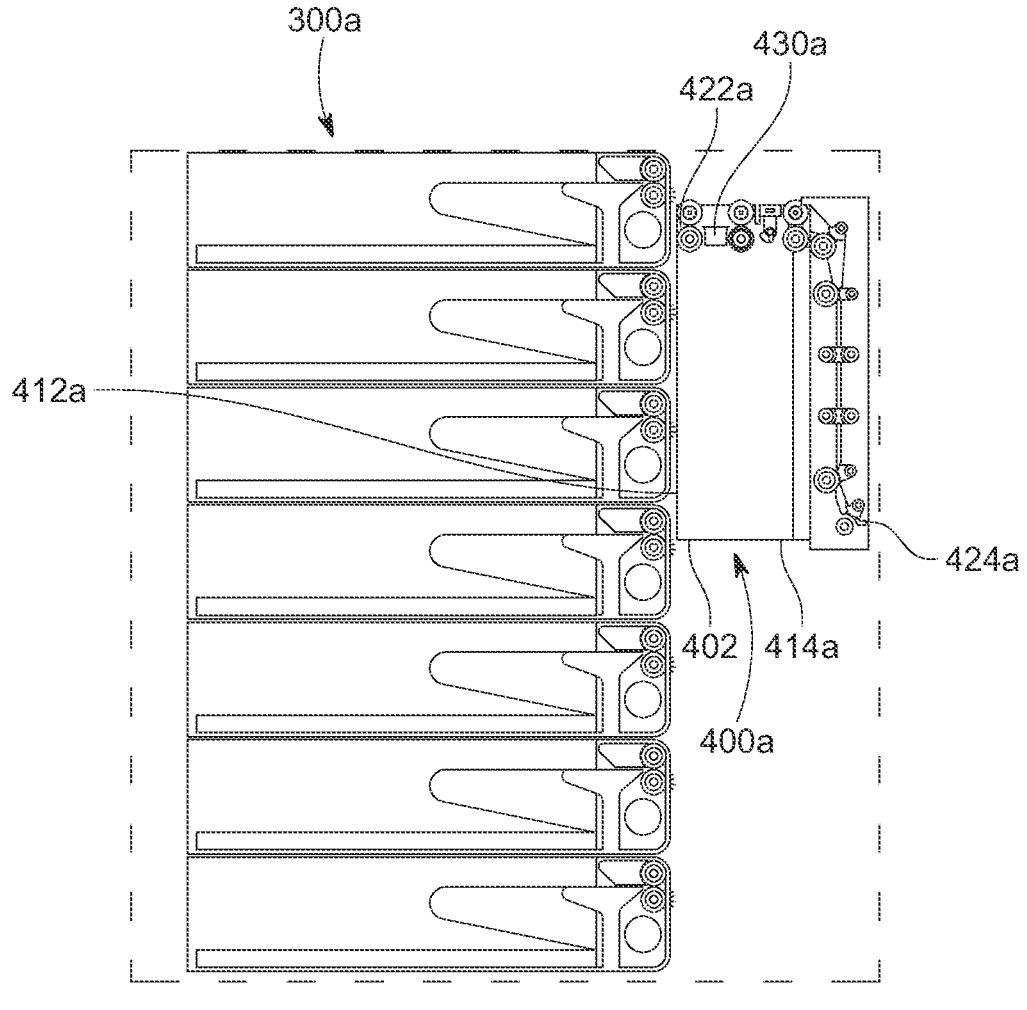
FIG. 7 is an enlarged fragmentary side view of the ticket drawer column and the ticket burster of FIG. 4.
Figure 8:
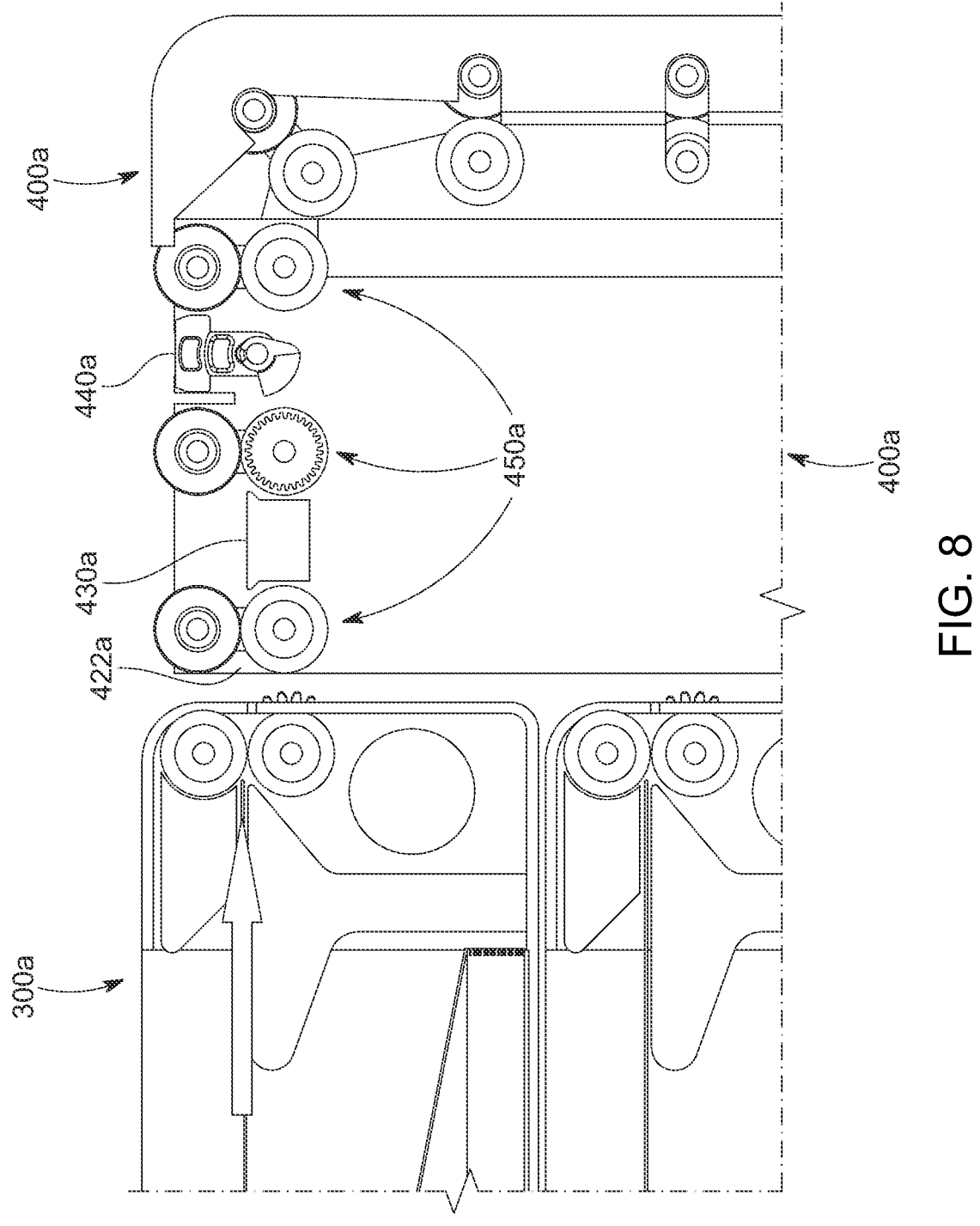
FIG. 8 is another enlarged fragmentary side view of the ticket drawer column and the ticket burster of FIG. 4.

As best shown in FIGS. 5, 6, and 7, the example movable ticket burster 400a generally includes: (a) a burster housing 402a; (b) one or more burster supporter connecters (such as burster support connector 401a connecting the burster housing 402a and the burster supporter 480a); (c) a barcode reader 430a in and supported by the burster housing 402a; (d) a ticket cutter 440a in and supported by the burster housing 402a; (e) a plurality of ticket engagers 450a supported by the burster housing 402a; and (f) a burster controller (not shown). The size and configuration of the ticket burster can vary in accordance with the present disclosure. As indicated above, it should also be appreciated that in other embodiments, the ticket burster includes more than one barcode reader for determining barcode related data and barcode positional data. As also indicated above, it should also be appreciated that in other embodiments, the ticket burster includes one or more barcode readers for determining barcode related data, and one or more other sensors for determining barcode positional data.

More specifically, the burster housing 402a generally includes a top member 404a, spaced-apart side members (not labeled), a front member 410a, a rear member 412a, and a bottom member 414a. The burster housing 402a also includes a plurality of internal members (not individually labeled) that define a ticket inlet 422a, through which the ticket burster 400a is configured to receive a lottery ticket from a ticket drawer of the ticket drawer column 300a, a ticket outlet 424a through which the ticket burster 400a is configured to dispense the received instant lottery ticket into the ticket collection receptacle 250, and a ticket movement path (not labeled) extending from the ticket inlet 422a to the ticket outlet 424a and through which the lottery ticket is moved through the ticket burster 400a.

The ticket cutter 440a is positioned in the burster housing 402a and configured to rotate to cut the perforations attaching each lottery ticket that moves along the ticket movement path in the ticket burster 400a to the next lottery ticket of the continuous strip of lottery tickets received from the respective ticket drawer. The ticket cutter 440a is configured to make such cut along the perforations between the two connected lottery tickets of such strip. The ticket cutter 440a is controlled by the burster controller and/or the controller of the ticket vending machine 100. In this example embodiment, the ticket cutter 440a is inwardly positioned (i.e., positioned downstream) from the ticket inlet 422a. After the ticket cutter 440a cuts the lottery ticket requested by the purchaser from the respective ticket drawer, the ticket drawer can retract the portion of the next lottery ticket (of the strip of lottery tickets) from the ticket burster 400a before the ticket burster 400a moves from the ticket receipt position aligned with that ticket drawer. This ticket movement can be caused by an actuation lever of the burster engaging a ticket movement assembly of the ticket drawer, or in another suitable manner. In other embodiments, the ticket burster 400a can be configured such that the ticket cutter is positioned closer to or on the other side of the ticket inlet (i.e., positioned upstream of the ticket inlet) such that after the ticket cutter cuts the lottery ticket along the perforations connecting that lottery ticket to the next lottery ticket in the strip, the ticket drawer may not need to withdraw the next instant lottery ticket in the strip or may only need to withdraw the next instant lottery ticket in the strip a relatively small distance. The position, size, and configuration of the ticket cutter can thus vary in accordance with the present disclosure.

In other embodiments, the ticket burster 400a can be configured such that the burster housing 402a is rotatable about a horizontal axis to separate (via a tearing and/or twisting motion) each lottery ticket along the perforations connecting that lottery ticket to the next lottery ticket in the strip. In such embodiments, the ticket drawer may not need to withdraw the next lottery ticket of the strip or may only need to withdraw the next lottery ticket of the strip a relatively small distance. In such embodiments, the ticket burster may not need a ticket cutter.

It should be appreciated that the ticket burster 400a is thus configured to burst the perforations between the lottery ticket being dispensed and the next lottery ticket of the strip so as to enable the dispensed lottery ticket to be dispensed into the ticket receptacle 250. This prevents a person from improperly tearing a lottery ticket or being able to pull an extended number of lottery tickets from one of the ticket packs in one of the ticket drawers. It should be appreciated that the ticket burster 400a can be moved to a dispensing location for each lottery ticket dispensed, or for only certain lottery tickets dispensed. It should also be appreciated that the ticket burster can moved to a different location for any lottery ticket that is deemed to be bad or non-dispensable for any reason, and to deposit that ticket into a suitable rejection area.

The ticket engagers 450a in this example embodiment include multiple driven rollers (not labeled) and multiple guide rollers (not labeled). The driven rollers are rotated by suitable actuators (not shown) under the control of the burster controller and/or the controller of the ticket vending machine 100. The driven rollers and the guide rollers are configured to move (such as by pulling) and guide each lottery ticket along the ticket movement path and out of the ticket outlet 424a. In alternative embodiments, the ticket engagers are configured to grip and pull each lottery ticket from the respective ticket drawer.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 400a. The burster controller can be hard wired or wirelessly connected to and in communication with the cutter 440a, the actuators for the driven rollers 450a, any actuators of the ticket burster 400a that cause the movement of the ticket burster 400a, and the reflective sensor 430a (as further described below). In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be hard wired to or wirelessly connected to and in communication with the cutter, the actuators for the driven rollers, any actuators on the ticket burster or the burster supporter that cause the movement of the ticket burster, and the reflective sensor.

The example barcode reader 430a of the ticket burster 400a is positioned in and supported by the housing 402a of the ticket burster 400a. The barcode reader 430a extends transversely along the entire or substantially the entire width of the ticket burster 400a such that the barcode reader 430a can sense the one or more barcodes and the relative positions of the barcode(s) of each lottery ticket that moves through the ticket burster 400a as that lottery ticket moves above the barcode reader 430a. In this example embodiment, the barcode reader 430a is below the ticket movement path and thus scans upwardly toward the lottery ticket. In other alternative embodiments that are not shown, the barcode reader can be above the ticket movement path and thus scan downwardly toward the lottery ticket (which would be oriented to have the barcode facing upwardly).

As indicated above, in various embodiments, each of the ticket bursters of the lottery ticket vending machine includes one or more suitable barcode readers configured to: (1) read the barcode on each lottery ticket received in such ticket burster and provide barcode related data to one or more controllers of the lottery ticket vending machine; and (2) provide barcode positional data to one or more controllers of the lottery ticket vending machine.

In various embodiments, the barcode reader 430a is configured to detect different contrasting colors (such as but not limited to black and white colors) associated with one or more barcodes of each lottery ticket. When light from an emitter (not shown) of the barcode reader 430a strikes an area of the barcode of the lottery ticket in the ticket burster 400a, that section reflects some or all of the light back toward the barcode reader 430a. When light from an emitter (not shown) of the barcode reader 430a strikes a black line of the barcode, the black line absorbs some or all of the light and does not reflect all of the light back toward the barcode reader 430a. For example, the white areas of the barcode of the lottery ticket in the ticket burster 400a will each reflect the light back toward the reflective sensor 430a, and the black lines of the barcode of the lottery ticket will not reflect the light back toward the barcode reader 430a (i.e., the black lines of the barcodes will absorb the light). When the light is reflected back toward the barcode reader 430a, that reflected light enters a receiver (not shown) of the barcode reader 430a (where the intensity of light can be increased if needed in certain embodiments). In various embodiments, the light emitted is a fixed amount of light and the reflected light back is a function of the color/contrast differential on the lottery ticket. It should be appreciated that the operation of the barcode reader (including the amount of light emitted by the barcode reader) can vary in accordance with the present disclosure.

In various embodiments, the barcode reader 430a creates and sends electrical signals (that can be digital or analog in different embodiments) to one or more of the controllers of the burster and/or the controller of the vending machine 100. The electrical signals represent two types of data (as indicated above). The first type of data is the barcode data that the controller(s) use to determine the identification of the lottery ticket. The second type of data is the barcode positional data that the controller(s) use to determine the relative position of the lottery ticket in the ticket burster 400a.

The respective controller(s) receive and interpret the barcode related data in a conventional manner, and thus is not described in detail herein.

The respective controller(s) receive and interpret the barcode positional data in comparison to comparison data (such as but not limited to an expected barcode positional data for the barcodes of the lottery tickets). If the barcode positional data does not correspond to or match (or substantially correspond to or match) the comparison data, the controller(s) determine(s) that the lottery ticket has a positional issue and can take the correction actions and/or send the alerts. In various embodiments, the corrective action and/or the alerts are based on the amount of disparity between barcode positional data and the comparison data (such as the expected barcode positional data). In various embodiments, the comparison data can be based on data associated with one or more stepper motors that control movement of the lottery ticket such as further described below.

The barcode reader 430a is thus configured to: (1) generate and communicate signals (relating to the positions of the barcode(s) of the lottery ticket); (2) communicate signals (relating to the positions of the barcode(s) of the lottery ticket) to the burster controller and/or the controller of the ticket vending machine 100; and (3) enable the controller(s) to determine if each lottery ticket is in the correct expected position as that lottery ticket moves from the ticket drawer into the ticket burster 400a and before it reaches the ticket cutter 440a.

If the burster controller and/or the controller of the ticket vending machine 100 determines that the position of the lottery ticket is proper, the burster controller and/or the controller of the ticket vending machine 100 does not need to take any corrective actions. For purposes of the present disclosure, the position of the lottery ticket can be proper if it is in the exact desired position, or not off from the exact desired position by more than a certain percentage or more than a certain distance.

If the burster controller and/or the controller of the ticket vending machine 100 determines that the position of the lottery ticket is improper, the burster controller and/or the controller of the ticket vending machine 100 can take one or more of a series of different corrective actions. For purposes of the present disclosure, the position of the lottery ticket is improper if it is off from the exact desired position by more than a certain percentage or more than a certain distance.

In various different embodiments, the respective corrective action taken in such case can vary and can be any one or more of the following example corrective actions: (1) cause a display of a warning message on a display device of the vending machine 100 to alert an operator of the vending machine 100 regarding the position issue to enable the operator to act on such issue and fix the issue; (2) send a warning message to a remote monitoring device separate from the vending machine regarding the position issue to enable an operator to act on such issue and fix the issue; and/or (3) automatically make an adjustment to one or more of the components of the vending machine 100 to attempt to address the position issue.

In various embodiments, the corrective action can include the controller(s) making one or more automatic adjustments of the cutting system of the ticket burster 400a.

In various embodiments, the corrective action can include the controller(s) making one or more automatic adjustments of the positioning of tickets relative to the ticket cutter of the ticket burster 400a.

It should be appreciated that by regularly scanning the barcodes of lottery tickets for positioning issues, the vending machine will be able to catch and cause such issues to be properly addressed before such issues cause lottery tickets that are undesired in look and feel, and/or not redeemable to be dispensed by the ticket vending machine.

It should also be appreciated that various embodiments of the present disclosure provide that the barcodes can be used to either fully locate the beginning or end of the lottery ticket for the dispensing process. These barcodes can be used to validate that the lottery ticket position is within acceptable margins or can be used to more properly index the lottery tickets and the perforation locations thereof for cutting. In certain embodiments, the barcode positional data can be compared or indexed relative comparison data including a step count of one or more stepper motors of the burster for this indexing. The controller(s) can compare the locations of the barcodes based on the barcode positional data to comparison data regarding the number of steps of the stepper motor to determined positions and any trend of changing positions. If such trending indicates potential lottery ticket misalignment, the controller can perform an arithmetic calibration on the next lottery ticket being dispensed or as a separate operation wherein the lottery ticket is moved out of the ticket drawer by the stepper motor and returned to validate the barcodes are within acceptable positional margins. If the problem is not resolved, the vending machine can either locally and/or remotely flag the ticket drawer as having a non-recoverable problem and provide any suitable alerts. In other words, it should also be appreciated that the vending machine 100 using the barcode readers creates a type of signature (in the form of the barcode positional data) for that lottery game that can be used to validate the physical registration of that lottery ticket relative to the steps of a stepper motor (not shown) that is dispensing the lottery ticket. If the registration of that lottery ticket become mismatched with the number of steps within a certain margin, the registration can be recalibrated to prevent miscutting of the lottery ticket.

The present disclosure contemplates the barcode reader(s) detecting the positions of one or more barcodes on a front or back surface of each lottery ticket in a pack of lottery ticket for these determinations. While the present disclosure uses barcodes on the back surfaces the lottery tickets as examples to describe the present disclosure, such examples are not meant to limit the present disclosure.

As further illustrated with respect to FIGS. 9 and 10, the back surface of each lottery ticket includes one or more barcodes that do not change in terms of position, shape, size, or clarity relative to the substrate of that lottery ticket for each and every lottery ticket in a pack of lottery tickets. Of course, while such features of the barcodes are the same, the individual combination of lines of each barcode will be different for each and every lottery ticket such that the bar code can provide the respective information or link to information for the respective lottery ticket.

Specifically, during the printing process for each lottery ticket of a pack of lottery ticket, one or more barcodes are formed on the back surface of the substrate of the lottery ticket (for identification of the lottery ticket) in the exact same location relative to: (1) the front and back edges and the side edges of that substrate for each and every such lottery ticket in the pack; and (2) the front and back edges and the side edges of that substrate for each and every such lottery ticket.

In one example shown in FIG. 9, the back surface 510 of the example lottery ticket 500 includes a single barcode 530 that includes a plurality of black lines that are perpendicular to the end edges 513 and 514 of the lottery ticket 500 and parallel to the side edges 515 and 516 of the lottery ticket 500. The barcode 530—which will appear on every lottery ticket in the pack or game in this example—provides a series of crisp white to black transitions that can be sensed by the barcode or other sensor(s) of the burster to enable the controller(s) to determine if the lottery ticket is correctly positioned relative to the sensor and thus the burster.

In another example shown in FIG. 10, the back surface 610 of the example lottery ticket 600 includes a single barcode 630 that includes a plurality of black lines that are perpendicular to the end edges 613 and 614 of the lottery ticket 600 and parallel to the side edges 615 and 616 of the lottery ticket 600. The barcode 630—which will appear on every lottery ticket in the pack or game in this example—provides a series of crisp white to black transitions that can be sensed by the barcode or other sensor(s) of the burster to enable the controller(s) to determine if the lottery ticket is correctly positioned relative to the sensor and thus the burster.

The present disclosure further contemplates that the controller(s) can determine the comparison data (such as for comparison with the barcode positional data) for the barcode(s) of each lottery ticket in any suitable manner such as but not limited to one of the plurality of different example manners described below.

In one example manner, the controller(s) are configured to receive the comparison data such as the expected barcode positional data for the barcodes(s) of each lottery ticket from a remote source such as a central lottery system. In various such embodiments, the central lottery system can send the expected barcode positional data for the barcode(s) of each lottery ticket to the vending machine when one or more packs are shipped to the location of the vending machine. In various such embodiments, the central lottery system can send the expected barcode positional data for the barcode(s) of each lottery ticket to the vending machine responsive to a request from the vending machine to activate the pack or a ticket of the pack.

In another example manner, the controller(s) are configured to receive the comparison data such as the expected barcode positional data for the barcodes(s) of each lottery ticket from a local source such from a memory device communicatively connected to the vending machine 100.

In another example manner, the controller(s) are configured to create or determine the comparison data such as the expected barcode positional data for the barcodes(s) of each lottery ticket during a pack loading procedure that the vending machine 100 performs when the pack is loaded into a ticket drawer of the vending machine.

In another example manner, the controller(s) are configured to create or determine the comparison data for the barcode(s) of each lottery ticket based on predefined information regarding the distances of the barcodes from the leading edge of the lottery ticket and data for one or more stepper motors based on movement of the lottery ticket caused by such stepper motors.

In various embodiments, the controller(s) of the ticket vending machine can receive or determine and maintain data regarding the length of each lottery ticket from its respective barcode(s) to both the leading edge, so the controller knows when to detect the barcodes(s) of the lottery tickets, or when to pay attention to the signals received from the barcode reader.

As indicated above, in alternative embodiments, the lottery ticket vending machine includes a barcode sensor to obtain barcode related data from each lottery ticket that moves into a ticket burster and another sensor to obtain barcode positional data for each lottery ticket that moves into a ticket burster. In such embodiments, the controller(s) would function in a same or similar manner to that described above with respect to the barcode position data.

It should be appreciated that the ticket vending machine of the present disclosure can have more than one ticket burster for each ticket drawer column such that they can operate at the same time, or such that one or more ticket bursters are back-ups in case there is an issue with one of the other ticket bursters for that ticket drawer column.

An example method of operation of the ticket vending machine 100 is now described. It should be appreciated that the following example is not the only method of operation of the ticket vending machine of the present disclosure, and other methods of operation are within the scope of the present disclosure. It should also be appreciated that the operations are controlled by the controller of the ticket vending machine and/or the controller of the ticket bursters, and that the descriptions provided below of the steps are controlled by such controllers.

This example is when a purchaser desires to purchase a single instant lottery ticket from the ticket vending machine 100. Responsive to and after the purchaser selects the lottery ticket (from the plurality of different lottery tickets available from the ticket vending machine 100) using the purchaser interface component(s) and specifically using one or more of the input devices and one or more of the payment acceptors to select and pay for the lottery ticket, the ticket vending machine 100 generally causes the ticket burster 400a to obtain and dispense that lottery ticket into the ticket collection receptacle 250. More specifically, this includes: (1) moving the ticket burster 400a into a ticket receipt position associated with and in alignment with the ticket drawer of the ticket draw column 300a that holds the lottery ticket pack of the selected type of lottery ticket requested by the purchaser; (2) causing the leading lottery ticket that ticket drawer to be fed into the ticket inlet 422a of the ticket burster 400a (with the front face of the lottery ticket facing upwardly); (3) causing the ticket engagers 450a to engage and cause that lottery ticket to move along the ticket movement path of the ticket burster 400a; (4) at the appropriate time when the barcode of that lottery ticket passes through a scan area above the barcode reader 430a, causing the barcode reader 430*a* to read the barcode(s) of that lottery ticket, and send barcode related signals to the burster controller and/or the controller of the ticket vending machine 100; (5) at the appropriate time when the perforations connecting that instant lottery ticket to the next lottery ticket of that strip are aligned with the ticket cutter 440*a*, causing the ticket cutter 440*a* to cut the perforations and thus separate that lottery ticket from the next lottery ticket in the strip; (6) causing the ticket drawer to retract any portion of that next lottery ticket of the strip from the ticket burster 400*a*; (7) causing the ticket burster 400*a* to move into alignment with the ticket collection receptacle 250; and (8) causing the ticket engagers 450*a* to move the separated lottery ticket along the ticket movement path toward and out of the ticket outlet 424*a*, and into the ticket collection receptacle 250. The method can include the controller of the ticket vending machine 100 also sending suitable data related to the dispensed lottery ticket to a central lottery server (not shown) for verification of that lottery ticket for possible subsequent redemption.

If the burster controller and/or the controller of the ticket vending machine 100 determines based on the position of the barcode that the lottery ticket has a positional issue, the burster controller and/or the controller of the ticket vending machine 100 can take one or more of the series of corrective actions described above before cutting the lottery ticket or after cutting the lottery ticket for subsequent lottery tickets.

In various embodiments, since the ticket vending machine 100 is regularly monitoring the positions of the barcode(s) of the dispensed lottery tickets, the ticket vending machine 100 will often be able to detect a positioning problem before the problem becomes severe enough to cause the ticket vending machine to shut down and stop dispensing lottery tickets. In various embodiments, when the ticket vending machine 100 detects a position problem that is severe, the controller(s) can cause the ticket vending machine to shut down and stop dispensing lottery tickets.

It should be appreciated from the above that various embodiments of the present disclosure provide a lottery ticket vending machine comprising: (1) a housing; (2) a ticket drawer column in the housing, the ticket drawer column comprising a plurality of ticket drawers, each of the ticket drawers configured to hold a strip of lottery tickets; (3) a ticket burster in the housing, the ticket burster defining a ticket inlet and a ticket outlet, the ticket burster movable to a plurality of different ticket receipt positions, each different ticket receipt position associated with and in alignment with a different one of the ticket drawers; (4) a barcode reader supported by the ticket burster and configured to create and send barcode positional data based on a position of a barcode of a lottery ticket that moves from one of the ticket drawers into the ticket burster; and (5) a controller configured to receive the barcode positional data from the barcode reader, determine if the lottery ticket has is improperly positioned based on the barcode positional data, and cause a corrective action to be taken responsive to determining that the lottery ticket is improperly positioned. In various such embodiments, the barcode reader is also configured to create and send barcode related data to the controller. In various such embodiments, the barcode reader is a first barcode reader, and which comprises a second barcode reader supported by the ticket burster and configured to create and send barcode related data to the controller. In various such embodiments, the barcode reader is configured to, for each of a plurality of lottery tickets received from one of the ticket drawers into the ticket burster, create and send to the controller barcode positional data based on a barcode of the lottery ticket. In various such embodiments, the barcode reader is positioned in the ticket burster such that the barcode reader is configured to create the barcode positional data based on the barcode of the lottery ticket before a cutter of the ticket burster cuts perforations connecting the lottery ticket to a next lottery ticket of the strip of lottery tickets. In various such embodiments, the controller is configured to determine if the lottery ticket has is improperly positioned based on a comparison of the barcode positional data and comparison data. In various such embodiments, the controller is configured to receive the comparison data. In various such embodiments, the controller is configured to create the comparison data. In various such embodiments, the lottery ticket vending machine comprises a display device and wherein the corrective action comprises causing a display, by the display device, of an indication of a lottery ticket positional issue. In various such embodiments, the corrective action comprises sending a message to a remote monitoring device separate from the lottery ticket vending machine regarding an indication of a lottery ticket positional issue. In various such embodiments, the corrective action comprises adjusting a position of a subsequent lottery ticket relative to a cutter of the ticket burster.

It should further be appreciated from the above that various embodiments of the present disclosure provide a lottery ticket vending machine comprising: (1) a housing; (2) a ticket drawer column in the housing, the ticket drawer column comprising a plurality of ticket drawers, each of the ticket drawers configured to hold a strip of lottery tickets; (3) a ticket burster in the housing, the ticket burster: (a) defining a ticket inlet and a ticket outlet, (b) movable to a plurality of different ticket receipt positions, each different ticket receipt position associated with and in alignment with a different one of the ticket drawers, (c) comprising a ticket cutter, and (d) comprising a barcode reader configured to create barcode positional data for a lottery ticket that moves from one of the ticket drawers into the ticket burster based on a barcode of the lottery ticket, wherein the barcode reader is positioned such that the barcode reader can determine the barcode positional data before the ticket cutter cuts perforations connecting the lottery ticket to a next lottery ticket of the strip of lottery tickets, and (e) configured to transmit the barcode positional data; and (4) a controller configured to receive the barcode positional data from the barcode reader, determine if the lottery ticket has a position issue based on the barcode positional data, and cause a corrective action to be taken responsive to determining that the lottery ticket has the position issue. In various such embodiments, the barcode reader is also configured to create and send barcode related data to the controller. In various such embodiments, the barcode reader is a first barcode reader, and which comprises a second barcode reader supported by the ticket burster and configured to create and send barcode related data to the controller. In various such embodiments, the lottery ticket vending machine comprises a display device and wherein the corrective action comprises causing a display, by the display device, of an indication of a lottery ticket positional issue. In various such embodiments, the corrective action comprises sending a message to a remote monitoring device separate from the vending machine regarding an indication of the position issue.

It should further be appreciated from the above that various embodiments of the present disclosure provide a lottery ticket vending machine comprising: (1) a housing; (2) a lottery ticket drawer supported by the housing; (3) a ticket burster supported by the housing and comprising a barcode reader; and (4) a controller supported by the housing, the controller configured to operate with the barcode reader to determine if lottery tickets from the lottery ticket drawer are being fed in to the ticket burster in proper positions to enable the ticket burster to properly separate lottery tickets received from the lottery ticket drawer based on one or more barcodes on the substrates of the lottery tickets, and to cause a corrective action to be taken responsive to determining that the lottery tickets are not in the proper positions. In various such embodiments, the barcode reader is also configured to create and send barcode related data for the lottery tickets to the controller. In various such embodiments, the barcode reader is a first barcode reader, and which comprises a second barcode reader supported by the ticket burster and configured to create and send barcode related data to the controller. In various such embodiments, the barcode reader is configured to create barcode positional data based on the barcodes of the lottery tickets that comprises lines that are parallel to a side edge of the lottery ticket, and the controller is configured to determine if the lottery tickets are in the proper positions based on comparisons using the barcode positional data.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket vending machine comprising:
    a housing;
    a ticket drawer column in the housing, the ticket drawer column comprising a plurality of ticket drawers, each of the ticket drawers configured to hold a strip of lottery tickets;
    a ticket burster in the housing, the ticket burster defining a ticket inlet and a ticket outlet, the ticket burster movable to a plurality of different ticket receipt positions, each different ticket receipt position associated with and in alignment with a different one of the ticket drawers;
    a barcode reader supported by the ticket burster and configured to create and send barcode positional data based on a position of a barcode of a lottery ticket that moves from one of the ticket drawers into the ticket burster; and
    a controller configured to receive the barcode positional data from the barcode reader, determine if the lottery ticket is improperly positioned based on the barcode positional data, and cause a corrective action to be taken responsive to determining that the lottery ticket is improperly positioned.

2. The lottery ticket vending machine of claim 1, wherein the barcode reader is also configured to create and send barcode related data to the controller.

3. The lottery ticket vending machine of claim 1, wherein the barcode reader is a first barcode reader, and which comprises a second barcode reader supported by the ticket burster and configured to create and send barcode related data to the controller.

4. The lottery ticket vending machine of claim 1, wherein the barcode reader is configured to, for each of a plurality of lottery tickets received from one of the ticket drawers into the ticket burster, create and send to the controller barcode positional data based on a barcode of the lottery ticket.

5. The lottery ticket vending machine of claim 1, wherein the barcode reader is positioned in the ticket burster such that the barcode reader is configured to create the barcode positional data based on the barcode of the lottery ticket before a cutter of the ticket burster cuts perforations connecting the lottery ticket to a next lottery ticket of the strip of lottery tickets.

6. The lottery ticket vending machine of claim 1, wherein the controller is configured to determine if the lottery ticket is improperly positioned based on a comparison of the barcode positional data and comparison data.

7. The lottery ticket vending machine of claim 6, wherein the controller is configured to receive the comparison data.

8. The lottery ticket vending machine of claim 6, wherein the controller is configured to create the comparison data.

9. The lottery ticket vending machine of claim 1, which comprises a display device and wherein the corrective action comprises causing a display, by the display device, of an indication of a lottery ticket positional issue.

10. The lottery ticket vending machine of claim 1, wherein the corrective action comprises sending a message to a remote monitoring device separate from the lottery ticket vending machine regarding an indication of a lottery ticket positional issue.

11. The lottery ticket vending machine of claim 1, wherein the corrective action comprises adjusting a position of a subsequent lottery ticket relative to a cutter of the ticket burster.

12. A lottery ticket vending machine comprising:
    a housing;
    a ticket drawer column in the housing, the ticket drawer column comprising a plurality of ticket drawers, each of the ticket drawers configured to hold a strip of lottery tickets;
    a ticket burster in the housing, the ticket burster:
        defining a ticket inlet and a ticket outlet,
        movable to a plurality of different ticket receipt positions, each different ticket receipt position associated with and in alignment with a different one of the ticket drawers,
        comprising a ticket cutter, and
        comprising a barcode reader configured to create barcode positional data for a lottery ticket that moves from one of the ticket drawers into the ticket burster based on a barcode of the lottery ticket, wherein the barcode reader is positioned such that the barcode reader can determine the barcode positional data before the ticket cutter cuts perforations connecting the lottery ticket to a next lottery ticket of the strip of lottery tickets, and
        configured to transmit the barcode positional data; and
    a controller configured to receive the barcode positional data from the barcode reader, determine if the lottery ticket has a position issue based on the barcode positional data, and cause a corrective action to be taken responsive to determining that the lottery ticket has the position issue.

13. The lottery ticket vending machine of claim 12, wherein the barcode reader is also configured to create and send barcode related data to the controller.

14. The lottery ticket vending machine of claim 12, wherein the barcode reader is a first barcode reader, and which comprises a second barcode reader supported by the ticket burster and configured to create and send barcode related data to the controller.

15. The lottery ticket vending machine of claim 12, which comprises a display device and wherein the corrective action comprises causing a display, by the display device, of an indication of a lottery ticket positional issue.

16. The lottery ticket vending machine of claim 12, wherein the corrective action comprises sending a message to a remote monitoring device separate from the vending machine regarding an indication of the position issue.

17. A lottery ticket vending machine comprising:

a housing;

a lottery ticket drawer supported by the housing;

a ticket burster supported by the housing and comprising a barcode reader; and a controller supported by the housing, the controller configured to operate with the barcode reader to determine if lottery tickets from the lottery ticket drawer are being fed in to the ticket burster in proper positions to enable the ticket burster to properly separate lottery tickets received from the lottery ticket drawer based on one or more barcodes on the substrates of the lottery tickets, and to cause a corrective action to be taken responsive to determining that the lottery tickets are not in the proper positions.

18. The lottery ticket vending machine of claim 17, wherein the barcode reader is also configured to create and send barcode related data for the lottery tickets to the controller.

19. The lottery ticket vending machine of claim 17, wherein the barcode reader is a first barcode reader, and which comprises a second barcode reader supported by the ticket burster and configured to create and send barcode related data to the controller.

20. The lottery ticket vending machine of claim 17, wherein the barcode reader is configured to create barcode positional data based on the barcodes of the lottery tickets that comprises lines that are parallel to a side edge of the lottery ticket, and the controller is configured to determine if the lottery tickets are in the proper positions based on comparisons using the barcode positional data.

\* \* \* \* \*